United States Patent Office 3,113,129
Patented Dec. 3, 1963

3,113,129
POLYMERIC ETHYLENEIMIDO POLYFLUORO-ALKOXY PHOSPHORUS NITRILES
Rudi F. W. Rätz, Hamden, Conn., assignor to Olin Mathieson Chemical Corporation, a corporation of Virginia
No Drawing. Filed Mar. 29, 1961, Ser. No. 99,060
6 Claims. (Cl. 260—239)

This invention relates to polymeric ethyleneimido polyfluoroalkoxy phosphorus nitriles and their preparation. The novel compounds of this invention have the formula:

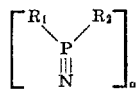

wherein the $R_1$ and $R_2$ substituents of each polymeric unit of the formula:

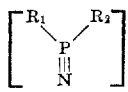

are independently selected from the group consisting of chlorine, bromine, fluorine, —$OCH_2(CF_2)_mY$ and

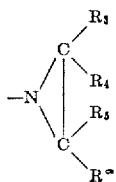

$R_3$, $R_4$, $R_5$ and $R_6$ are selected from the group consisting of hydrogen, alkyl radicals of 1 to 4 carbon atoms and phenyl, Y is selected from the group consisting of hydrogent and fluorine, $m$ is an integer of from 1 to 20, $n$ is an integer of from 3 to 7, and wherein in the said polymeric compounds at least one of the $R_1$ and $R_2$ substituents is —$OCH_2(CF_2)_mY$ and, at least one of the $R_1$ and $R_2$ substituents is

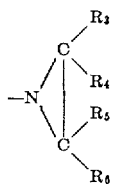

and all of the halogen substituents of $R_1$ and $R_2$ are the same.

The polymeric ethyleneimido polyfluoroalkoxy phosphorus nitriles of this invention are prepared in good yield by reaction of a polymeric ethyleneimido phosphorus nitrilic halide with an alkali metal salt of a polyfluoro carbinol.

The polymeric ethyleneimido phosphorus nitrilic halides useful as starting materials have the formula:

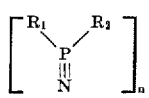

wherein the $R_1$ and $R_2$ substituents of each polymeric unit of the formula:

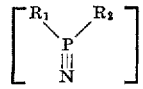

are independently selected from the group consisting of chlorine, bromine, fluorine and

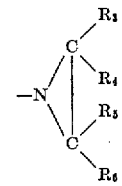

wherein $R_3$, $R_4$, $R_5$ and $R_6$ are selected from the group consisting of hydrogen, alkyl radicals of 1 to 4 carbon atoms and phenyl, $n$ is an integer of from 3 to 7, and wherein in the said polymeric compounds at least one of the $R_1$ and $R_2$ substituents is

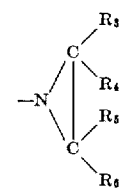

and all of the halogen substituents of $R_1$ and $R_2$ are the same.

Useful polymeric ethyleneimido phosphorus nitrilic halides include trimeric ethyleneimido phosphonitrilic pentachloride, trimeric 2-methyl-ethyleneimido phosphonitrilic pentachloride, tetrameric 2-methyl-ethyleneimido phosphonitrilic heptachloride, trimeric 3,5-bis (2,2-dimethyl-ethyleneimido) phosphonitrilic tetrachloride, trimeric 3,5-bis-ethyleneimidophosphonitrilic tetrachloride, hexameric 4,6-bis-ethyleneimido phosphonitrilic decachloride, trimeric 3,5 - bis(2,3 - diphenylethyleneimido) phosphonitrilic tetrachloride, trimeric 3,3,5,5,-tetrakis-ethyleneimido phosphonitrilic tetrachloride, heptameric 5,5,7,7-tetrakis ethyleneimido phosphonitrilic decachloride, trimeric 3,3,5,5 - tetrakis - (2,2-diethyl-3-n-propyl-ethyleneimido) phosphonitrilic dichloride, trimeric 1,3,3,5,5-pentakis-ethyleneimido phosphonitrilic chloride, trimeric 1,3,3,5,5-pentakis-(2,2,3-triethylimido) phosphonitrilic chloride, hexameric 1,1,3,3,5,5-hexakis-ethyleneimido phosphonitrilic hexachloride, etc. and the corresponding bromine and fluorine derivatives. The polymeric ethyleneimido phosphorus nitriles can be prepared by reacting a polymeric phosphorus nitrilic halide of the formula

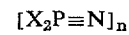
$$[X_2P\equiv N]_n$$

wherein X is a halogen selected from the group consisting of chlorine, bromine, and fluorine with ethyleneimine or an ethyleneimine derivative at a temperature of from about 20° C. to about 100° C.

Alkali metal salts of the polyfluoro carbinols suitable as starting materials have the formula:

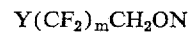
$$Y(CF_2)_mCH_2ON$$

wherein Y is hydrogen or fluorine, $m$ is an integer, e.g. 1 to 20, and M is an alkali metal, e.g. sodium, lithium, or potassium.

The reaction proceeds as shown in the following equation in which, by way of illustration, the preparation of trimeric 3,5-bis-ethyleneimido-bis-alpha,alpha-H,H-heptafluorobutoxy phosphonitrilic dichloride is given:

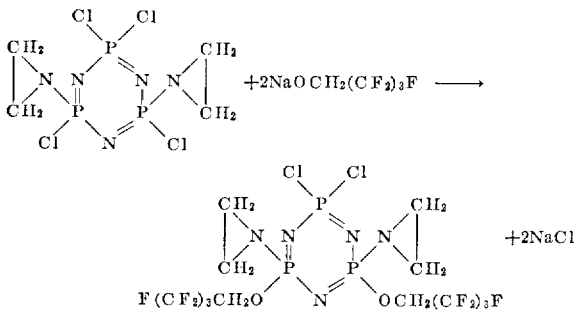

Although it is not necessary to carry out the reaction between polymeric ethyleneimido phosphonitrilic halide and the alkali metal salt of the polyfluoro carbinol in the presence of a solvent it is convenient to do so in the first phase of the reaction. Suitable inert solvents include benzene, toluene, xylene, the lower dialkyl ethers, ligroine, dioxane, etc. It has been found, however, that the replacement of the final halide atoms attached to the phosphorus nitrile ring can best be accomplished by carrying out the reaction in the absence of a solvent. For example, the compound trimeric 3,5-bis-ethyleneimido phosphonitrilic tetrachloride can be reacted with sodium heptafluorobutoxide in refluxing ether to give 3,5-bis-ethyleneimidobis alpha,alpha-H,H-heptafluorobutoxy-phosphonitrilic dichloride. In replacing the remaining two chlorine atoms of the 3,5-is-ethyleneimido-bis-alpha,alpha-H,H-heptafluorobutoxy-phosphonitrilic dichloride it has been found necessary to carry out the reaction with additional sodium heptafluorobutoxide in a dry state. The resulting trimeric 3,5 - bis - ethyleneimido-1,1,3,5-tetrakis-alpha,alpha-H,H-heptafluorobutoxy phosphorus nitrile can be conveniently separated from the reaction mixture by vacuum distillation. In general the reaction between the polymeric ethyleneimido phosphonitrilic halide proceeds at temperatures of about 80° to about 150° C. When a solvent is employed, the alkali metal halide formed in the reaction is generally insoluble in it. The end of the reaction can be determined by the point where no more alkali metal halide is formed. The salt formed in the reaction can be removed by filtration or by washing with water. The remaining product is then separated by distillation.

The novel polymeric ethyleneimido polyfluoroalkoxy phosphorus nitriles of this invention can also be prepared by reacting a polymeric polyfluoroalkoxy phosphorus nitrilic halide with ethyleneimine or with an ethyleneimine derivative.

The ethyleneimines suitable for the reaction have the formula:

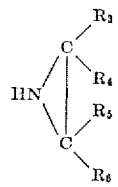

wherein $R_1$, $R_2$, $R_3$ and $R_4$ are hydrogen, alkyl, e.g. methyl, ethyl, propyl, butyl, or aryl, e.g. phenyl.

The polymeric polyfluoroalkoxy phosphorus nitrilic halides suitable as starting materials have the formula:

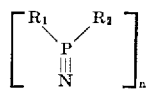

wherein the $R_1$ and $R_2$ substituents of each polymeric unit of the formula:

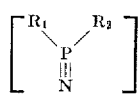

are independently selected from the group consisting of chlorine, bromine, fluorine and —$OCH_2(CF_2)_mY$, wherein $n$ is an integer of from 3 to 7, is an integer of from 1 to 20, Y is selected from the group consisting of hydrogen and fluorine, and wherein in the said polymeric compounds at least one of the $R_1$ and $R_2$ substituents is —$OCH_2(CF_2)_mY$ and all of the halogen substituents of $R_1$ and $R_2$ are the same. The polymeric polyfluoroalkoxy phosphorus nitriles can be prepared by reacting a polymeric phosphorus nitrilic halide of the formula $$[X_2P\equiv N]_n$$

wherein X is a halogen selected from the group consisting of chlorine, bromine, and fluorine with an alkali metal salt of a polyfluorocarbinol of the formula:

$$MOCH_2(CF_2)_mY$$

wherein Y is hydrogen or fluorine, m is an integer of from 1 to 20, and M is an alkali metal.

Useful polymeric polyfluoroalkoxy phosphorus nitrilic halides include, for example, trimeric alpha,alpha-H,H-trifluoroethoxy phosphonitrilic pentachloride, tetrameric bis-alpha,alpha-H,H-trifluoroethoxy phosphonitrilic hexachloride, trimeric 3,5-bis-alpha,alpha-H,H-heptafluorobutoxy phosphonitrilic tetrachloride, hexameric 3,5-bis-alpha,alpha-H,H-heptafluorobutoxy phosphonitrilic decachloride, trimeric 3,5-bis-alpha,alpha-H,H-pentafluoropropoxy phosphonitrilic tetrachloride, tetrameric 3,5-bis-alpha,alpha-H,H-heptafluorobutoxy phosphonitrilic hexachloride, trimeric 3,3,5,5-tetrakis-alpha,alpha-H,H-pentafluoropropoxy phosphonitrilic dichloride, trimeric 1,3,5-tris - alpha,alpha-H,H-heptafluorobutoxy phosphonitrilic trichloride, trimeric 1,3,3,5,5-pentakis-alpha,alpha, omega-H,H,H-dodecafluoroheptoxy phosphonitrilic chloride, trimeric 3,3,5,5 - tetrakis-alpha,alpha,omega-H,H,H-eicosafluoroundecanoxy phosphonitrilic dichloride, etc. and the corresponding bromine and fluorine derivatives.

The reaction between the polymeric polyfluoroalkoxy phosphonitrilic halide and ethyleneimine or an ethyleneimine derivative proceeds as shown in the following equation in which, by way of illustration are preparation of trimeric 1,1-bis-ethyleneimido-3,3-bis-alpha, alpha-H,H-heptafluorobutoxy phosphorus nitrilic dichloride is given:

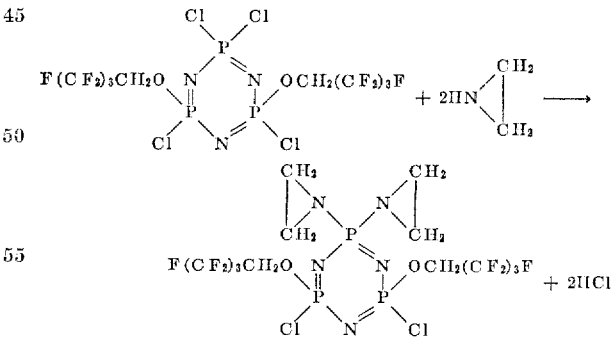

In the reaction hydrogen halide is formed which must be bound by a hydrogen halide acceptor in order to complete the reaction. This can be done, for example, by using a 100 percent excess of the applied ethyleneimine derivative, or by adding a tertiary base, such as triethylamine, dimethylaniline, or pyridine in the required amount to the reaction mixture. Preferably, the reaction is carried out in a suitable solvent which is inert to the polymeric polyfluoroalkoxy phosphorus nitrilic halide as well as to the applied ethyleneimine. Suitable solvents are, for example, benzene, toluene, xylene, ether, dioxane and tetrahydrofurane.

The reaction between the polymeric polyfluoroalkoxy phosphonitrilic halide and the ethyleneimine or ethyleneimine derivative is carried out by admixing the reactants and usually proceeds exothermically at room temperature. If necessary, the reaction can be started by a short warming period. In some cases the reaction can be completed in a shorter time by heating the reaction mixture for several hours to a temperature not exceeding 100° C., but in general, because of the highly reactive nature of the polymeric ethyleneimido polyfluoroalkoxy phosphorus nitriles, the use of elevated temperature during this reaction is not recommended.

Since the hydrohalide of the organic base formed as a by-product during the reaction, is usually insoluble in the applied solvent whereas the desired ethyleneimido polyfluoroalkoxy phosphorus nitrile is usually very soluble, the isolation of the desired reaction product encounters no difficulty. The hydrohalide salts are removed by filtration and the filtrate concentrated, preferably in a vacuum, in order to obtain the desired compound.

Surprisingly it has been found that the compounds of this invention can be distilled in vacuo with the retention of both the phosphorus nitrogen ring and the three-membered ethyleneimido ring. The presence of the polyfluoroalkoxy groups stabilize the phosphorus-nitrogen ring system and furthermore gives enough volatility to the whole molecule to permit vacuum distillation to be achieved without affecting the sensitive ethyleneimido ring.

Compounds of the invention provide an excellent starting material for the preparation of novel polymers, containing the stable polyfluoroalkoxy phosphonitrile ring system as the basic building block. Due to the presence of the reactive ethyleneimino groups the phosphorus-nitrogen rings can be connected to a cyclic-linear polymer with thermal and chemical properties, similar to those of the fluid and waxy polyfluoroalkyl phosphonitrilates. This polymerization or polyaddition can be achieved with the aid of acid catalysts or by reaction with dior polyfunctional alcohols or amines, resp. Suitably hydroxy compounds for this polyaddition reaction are, for example, ethyleneglycol, glycerol, pentaerythritol, hexamethyleneglycol, diethyleneglycol, triethyleneglycol, resorcinol, bis-p-hydroxy-phenyl-dimethylmethane, and the fluorinated diols such as 1,4-tetrafluorobutanediol, 1,5-hexafluoropentanediol. Suitable amines are, for example, ethylenediamine, propylenediamine, hexamethylenediamine, and p-phenylenediamine. Transformation of compounds of type I into polymeric resinous materials is also possible by reacting these compounds with alkanolamines, such as ethanolamine, di- and triethanolamines, furthermore with amides and imides of aliphatic and aromatic mono- or dibasic acids, such as lauric acid amide, stearic acid amide, succinic imide, adipic acid diamide, hexafluoroglutaric diamide, hexafluoroglutaric imide, etc.

Because of the reactivity of the ethyleneimido groups contained in the ethyleneimido polyfluoroalkoxy phosphorus nitriles, the compounds can serve as valuable intermediates in the synthesis of other phosphorus containing products, for example, insecticides.

The following examples will serve to further illustrate the invention.

EXAMPLE I

*(A) Trimeric 3,5-Bis-Ethyleneimido Phosphonitrilic Tetrachloride*

To a solution of 34.8 grams of trimeric phosphonitrilic chloride $(Cl_2PN)_3$ in 350 milliliters of toluene a mixture of 20.2 grams of triethylamine, 8.2 grams of ethyleneimine, and 75 milliliters of toluene was added dropwise, with stirring, over a period of 45 minutes. The mixture was allowed to stand overnight and the separated triethylamine hydrochloride removed by filtration. After distilling off the solvent in vacuo, a semicrystalline residue was obtained. Extraction of this residue with ether and removal of the ether from the extract by distillation gave 8 grams of a crystalline product which was still contaminated with some resinous material. After treating the crystals with cold ethanol, they were recrystallized from Skellysolve B yielding colorless crystals of trimeric 3,5-bis-ethyleneimido phosphonitrilic tetrachloride (M.P. 105° C.).

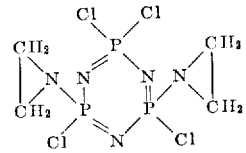

Calcd. for $C_4H_8P_3N_5Cl_4$:
C, 13.31; H, 2.23; N, 19.41; P, 25.75; Cl, 39.30.
Found:
C, 13.16; H, 2.20; N, 19.18; P, 26.20; Cl, 39.27.
C, 13.36; H, 2.35; N, 19.34; P, 26.46; Cl, 39.28.

*(B) Trimeric 3,5-Bis-Ethyleneimido-1,1-Bis-Alpha,Alpha-H,H-Heptafluorobutoxy Phosphonitrilic Dichloride*

An amount of 3.61 grams of trimeric 3,5-bis-ethyleneimido phosphonitrilic tetrachloride prepared as described in (A) above, was dissolved in 40 milliliters of ether and a solution of 9.0 grams of sodium heptafluorobutoxide in 50 milliliters of the same solvent was added dropwise. The mixture was then refluxed for two hours, whereupon sodium chloride separated. After filtering the solution, refluxing was continued for one hour. The ether was removed by distillation and there was recovered 9.9 grams of trimeric 3,5 - bis-ethyleneimido-1,1-bis-alpha, alpha-H,H-heptafluorobutoxy phosphonitrilic dichloride, an oily liquid (B.P. 124–126° C. (0.5 m.); $n^{23}D$ 1.4028).

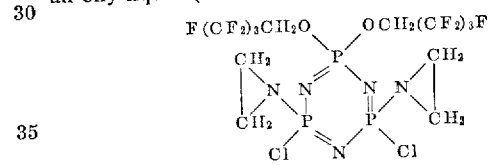

Calcd. for $C_{12}H_{12}N_5P_3F_{14}Cl_2O_2$:
C, 20.93; H, 1.75; N, 10.18; P, 13.53; F, 38.66; Cl, 10.31.
Found:
C, 21.42; H, 1.93; N, 9.57; P, 12.65; F, 40.24; Cl, 9.29.
C, 21.55; H, 2.16; N, 9.41; P, 12.97; F, 40.08; Cl, 9.08.

EXAMPLE II

*Trimeric 3,5-Bis-Ethyleneimido-1,1-Bis-Alpha,Alpha-H, H-Heptafluorobutoxy Phosphonitrilic Dichloride*

The reaction of Example I (B) was repeated using the same amounts of the reactants. In this example, however, xylene, was employed as the solvent. A total of 9.5 grams of trimer - 3,5 - bis-ethyleneimido-1,1-alpha-alpha-H,H-heptafluorobutoxy phosphonitrilic dichloride was recovered ($n^{23}D$ 1.4027).

EXAMPLE III

*Trimeric 3,5-Bis-Ethyleneimido-1,1,3,5-Tetrakis-Alpha, Alpha-H,H-Heptafluorobutoxy Phosphorus Nitrile*

An amount of 2.83 grams of trimeric 3,5-bis-ethyleneimido - 1,1-bis-alpha,alpha-H,H-heptafluorobutoxy phosphonitrilic dichloride prepared in Example I (B) was placed in a 20 ml. sausage Claisen flask and 1.9 grams of powdered sodium heptafluorobutoxide added. The mixture was slowly heated by means of an oil bath at 130° C. and maintained at this temperature for four hours. The reaction product was recovered from the reaction mixture by means of vacuum distillation conducted at 1 mm. Hg. During the distillation the oil bath temperature was increased slowly to 210° C. The obtained colorless oil which was redistilled twice over a small amount of fresh sodium heptafluorobutoxide crystallized on standing within one week. Recrystallization from Skellysolve B yielded 2.0 grams (48 percent of the theoretical quantity) of trimeric 3,5-bis-ethyleneimido-1,1,3,5-tetrakis-alpha, alpha-H,H-heptafluorobutoxy phosphorus nitrile in the form of colorless needles (M.P. 49.5° C.).

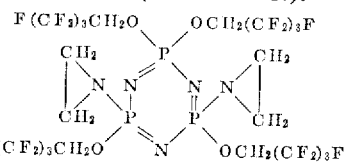

Calcd. for $C_{20}H_{16}F_{28}N_5P_3O_4$:
  C, 23.64; H, 1.58; F, 52.40; N, 6.90; P, 9.17.
Found:
  C, 23.70; H, 1.66; F, 50.42; N, 7.40; P, 8.94.
  C, 23.77; H, 1.82; F, 50.18; N, 7.46; P, 8.70.

EXAMPLE IV (A) *Trimeric 3,5-Bis-Ethyleneimido,3,5-Bis-Alpha,Alpha-H,H-Pentafluoropropoxy Phosphonitrilic Dichloride*

An amount of 7.5 grams of sodium pentafluoropropoxide (0.04 mole) was suspended in 200 milliliters of sodium-dried xylene. A solution of 3.61 grams of trimeric 3,5-bis-ethyleneimido phosphonitrilic tetrachloride prepared in Example I (A) in 75 milliliters of the same solvent was added dropwise with moderate stirring at 100° C. After the addition was completed, the mixture was refluxed for 24 hours. The amount of the separated sodium chloride corresponded to the formation of trimeric 3,5-bis-ethyleneimido-3,5-bis-pentafluoropropoxy phosphonitrilic dichloride. After removal of the solvent by vacuum distillation, 5.6 grams of trimeric 3,5-bis-ethyleneimido-3,5-bis-alpha,alpha - H,H - pentafluoropropoxy phosphonitrilic dichloride (an oily material) was obtained; B.P. 134–139° C. (1.8 mm.). Yield: 95.5 percent.

(B) *Trimeric 3,5-Bis-Ethyleneimido,1,1,3,5-Tetrakis-Alpha,Alpha-H,H-Pentafluoropropoxy Phosphorus Nitrile*

Compound A in the amount of 3.57 grams was placed in a 20 ml. Claisen flask with sausage receiver and mixed with 3.5 grams of dry, powdery sodium pentafluoropropoxide. Upon heating the mixture to 120° C., a strong exothermic reaction was observed with was moderated by cooling with ice water. After the main reaction was over, the mixture was heated again and maintained for 30 minutes at 145° C. Separation of the formed trimeric 3,5-bis-ethyleneimido - 1,1,3,5 - tetrakis - alpha,alpha-H,H-pentafluoropropoxy phosphorus nitrile was achieved by vacuum distillation. Redistillation yielded 2.7 grams (44.6 percent of the theoretical yield) of a colorless oil; B.P. 149–153° C. (1.5 mm.); $n^{27}D$ 1.3699.

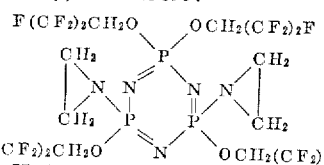

Calcd. for $C_{16}H_{16}F_{20}N_5P_3O_4$:
  C, 23.55; H, 1.96; F, 46.7; N, 8.59; P, 11.40.
Found:
  C, 24.94; H, 2.06; F, 46.36; N, 9.40; P, 10.79.
  C, 24.97; H, 2.34; F, 46.52; N, 9.70; P, 10.76.

EXAMPLE V (A) *Trimeric 3,3,5,5-Tetrakis-Alpha,Alpha-H,H-Heptafluorobutoxy Phosphonitrilic Dichloride*

An amount of 19.2 g. of sodium hydride (0.8 mole) was dissolved in a solution of 320 g. of heptafluorobutanol (100 percent excess) in 100 ml. of dry ether. After complete solution was effected, the ether and excess heptafluorobutanol were removed by distillation.

The residual solid (sodium heptafluorobutoxide) was suspended in 1000 ml. of dry toluene, and a solution of 69.6 g. of trimeric phosphonitrilic chloride (0.2 mole) in 100 ml. of toluene was added dropwise with stirring. After the addition was completed, the mixture was refluxed with stirring for four hours. The collected sodium chloride amounted to 47.2 g. During the distillation of the first 100 ml. of toluene, a small amount of the excess of free heptafluorobutanol, still present in the mixture, distilled over simultaneously with the solvent. The oily residue obtained amounted to 178.5 g. By repeated fractionation through a Vigreaux column 37.0 grams of trimeric 3,3,5,5 - tetrakis - alpha,alpha - H,H - heptafluorobutoxy phosphonitrilic dichloride [B.P. 125°–127° C. (5 mm.), $n^{24}D$ 1.3533] was obtained.

The yield was approximately 20 percent of the theoretical quantity.

(B) *Trimeric 1,1 - Bis - Ethyleneimido-3,3,5,5-Tetrakis-Alpha,Alpha-H,H-Heptafluorobutoxy Phosphorus Nitrile*

An amount of 10.02 g. of trimeric 3,3,5,5-tetrakis-alpha, alpha-H,H-heptafluorobutoxy phosphonitrilic-1,1-dichloride (0.01 mole) was dissolved in 70 ml. of dry toluene and the solution placed in a 250 ml., 3-neck round bottom flask equipped with stirrer, reflux condenser and dropping funnel. A mixture of 1.04 g. of ethyleneimine and 2.13 g. of triethylamine dissolved in 15 ml. of toluene was added dropwise with stirring over a period of 5 minutes. An exothermic reaction was observed which resulted in the formation of 2.81 g. of toluene-insoluble triethylamine-hydrochloride which was collected on a Buchner funnel after 2 hours of standing. After evaporation of the solvent there was obtained 10.2 grams (98 percent of the theoretical quantity) of trimeric 1,1-bis-ethyleneimido-3,3,5,5-tetrakis-alpha,alpha-H,H-heptafluorobutoxy phosphorus nitrile, a colorless oil, B.P. 154° C. (1.4 mm.); $n^{25}D$ 1.3660.

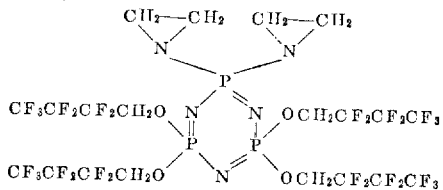

Calcd. for $C_{20}H_{16}O_4N_5P_3F_{28}$:
  C, 24.64; H, 1.58; F, 52.40; N, 6.90; P, 9.17.
Found:
  C, 24.56; H, 1.81; F, 52.18 N, 7.54; P, 9.48.

EXAMPLE VI

A sample of trimeric 3,5-bis-ethyleneimido-1,1,3,5-tetrakis-alpha,alpha - H,H - heptafluorobutyl phosphorus nitrile (2.112 grams) was mixed with diethyleneglycol (0.057 gram) in a mole ratio of 1:1 and heated for two hours at 160° C. and finally for one hour at 200° C. The resulting product was an amber colored thermoplastic resin which was not affected by prolonged heating at 275° C.

What is claimed is:

1. Polymeric compounds of the formula:

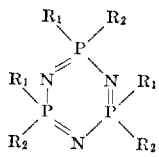

wherein $R_1$ and $R_2$ are independently selected from the group consisting of chlorine, bormine, fluorine and $$-OCH_2(CF_2)_mY$$

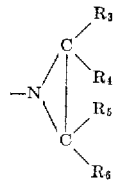

wherein $R_3$, $R_4$, $R_5$ and $R_6$ are selected from the group consisting of hydrogen, alkyl of 1 to 4 carbon atoms and phenyl, Y is selected from the group consisting of hydrogen and fluorine, $m$ is an integer of from 1 to 20 and wherein in the said polymeric compounds at least one of the $R_1$ and $R_2$ substituents is —$OCH_2(CF_2)_mY$, at least one of the $R_1$ and $R_2$ substituents is

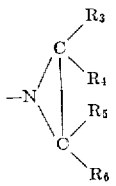

and all of the halogen substituents of $R_1$ and $R_2$ are the same.

2. Trimeric 3,5-bis-ethyleneimido-1,1-bis-alpha,alpha-H,H-heptafluorobutoxy-phosphonitrilic dichloride.

3. Trimeric 3,5-bis-ethyleneimido - 1,1,3,5 - tetrakis-alpha,alpha-H,H-heptafluorobutoxy phosphorus nitrile.

4. Trimeric 3,5-bis-ethyleneimido - 1,1,3,5 - tetrakis-alpha,alpha-H,H-pentafluoropropoxy phosphorus nitrile.

5. Trimeric 1,1-bis-ethyleneimido - 3,3,5,5 - tetrakis-alpha,alpha-H,H-heptafluorobutoxy phosphorus nitrile.

6. Trimeric 3,5-bis-ethyleneimido-3,5-bis-alpha,alpha-H,H-pentafluoropropoxy phosphonitrilic dichloride.

References Cited in the file of this patent

Bode et al.: Berichte, vol. 81, pages 547–552 (1948).
Bull: Dissertation Abstracts, vol. 18, pages 384–85 (1958).

UNITED STATES PATENT OFFICE
CERTIFICATE OF CORRECTION

Patent No. 3,113,129　　　　　　　　　　　　　December 3, 1963

Rudi F. W. Rätz

It is hereby certified that error appears in the above numbered patent requiring correction and that the said Letters Patent should read as corrected below.

Column 1, lines 30 to 36, the structural formula should appear as shown below instead of as in the patent:

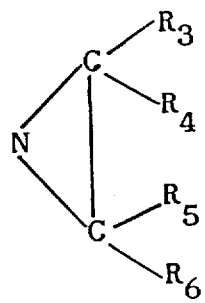

column 3, line 31, for "3,5-is" read -- 3,5-bis --; column 4, line 3, for "3 to 7, is" read -- 3 to 7, m is --; line 22, for "tertameric" read -- tetrameric --; line 42, for "are" read -- the --; column 5, line 34, for "Suitably" read -- Suitable --; column 8, line 49, for "heptafluorobutyl" read -- heptafluorobutoxy --; line 65, for "bormine" read -- bromine --.

Signed and sealed this 12th day of May 1964.

(SEAL)
Attest:

ERNEST W. SWIDER

Attesting Officer

EDWARD J. BRENNER

Commissioner of Patents